US009264669B2

(12) United States Patent
Allard

(10) Patent No.: US 9,264,669 B2
(45) Date of Patent: Feb. 16, 2016

(54) CONTENT MANAGEMENT THAT ADDRESSES LEVELS OF FUNCTIONALITY

(75) Inventor: James F Allard, Seattle, WA (US)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 574 days.

(21) Appl. No.: 12/037,920

(22) Filed: Feb. 26, 2008

(65) Prior Publication Data

US 2010/0011050 A1 Jan. 14, 2010

(51) Int. Cl.
*G06F 15/16* (2006.01)
*H04N 7/173* (2011.01)
*H04N 21/2343* (2011.01)
*H04N 21/258* (2011.01)
*H04N 21/414* (2011.01)
*H04H 20/42* (2008.01)

(52) U.S. Cl.
CPC ............ *H04N 7/173* (2013.01); *H04H 20/42* (2013.01); *H04N 21/2343* (2013.01); *H04N 21/25833* (2013.01); *H04N 21/41407* (2013.01)

(58) Field of Classification Search
CPC . H04H 20/42; H04H 21/41407; H04H 7/173; H04H 21/2343; H04H 21/25833
USPC ......................................... 709/230, 239, 241
See application file for complete search history.

(56) References Cited

U.S. PATENT DOCUMENTS

| 5,220,420 | A  | 6/1993  | Hoarty            |
|-----------|----|---------|-------------------|
| 6,237,049 | B1 | 5/2001  | Ludtke            |
| 6,490,000 | B1 | 12/2002 | Schaefer          |
| 6,510,210 | B1 | 1/2003  | Baughan           |
| 6,553,345 | B1 | 4/2003  | Kuhn              |
| 6,650,248 | B1 | 11/2003 | O'Donnell         |
| 6,741,684 | B2 | 5/2004  | Kaars             |
| 6,972,680 | B2 | 12/2005 | Yui               |
| 6,986,148 | B2 | 1/2006  | Johnson, Jr. et al. |
| 7,113,776 | B2 | 9/2006  | Minear et al.     |
| 7,146,632 | B2 | 12/2006 | Miller            |
| 7,167,639 | B2 | 1/2007  | Haddad            |

(Continued)

FOREIGN PATENT DOCUMENTS

| CN | 1742480  | 3/2006 |
|----|----------|--------|
| CN | 1747602  | 3/2006 |
| CN | 1777876  | 5/2006 |
| EP | 1276318  | 1/2003 |
| JP | H0991232 | 4/1997 |

(Continued)

OTHER PUBLICATIONS

O'Hear, "Microsoft brings Windows Live Messenger to XBox 360", Apr. 9, 2007, retrieved at <<http://blogs.zdnet.com/social/?p=135>> pp. 1.

(Continued)

*Primary Examiner* — Joseph Greene
(74) *Attorney, Agent, or Firm* — Micah Goldsmith; Judy Yee; Micky Minhas

(57) ABSTRACT

Data can be provided via devices based on levels of functionalities of the devices. In one example, a broker receives content from a data source and sends the content to devices in a network for presentation to a user. The devices may have different functionalities and the broker may modify the data content in accordance with each devices level of functionality. Modification of the data content may include, for example, re-formatting or changing the amount of content to be displayed or provided at the respective devices in the network.

20 Claims, 7 Drawing Sheets

(56) References Cited

U.S. PATENT DOCUMENTS

| | | | |
|---|---|---|---|
| 7,218,838 B2 | 5/2007 | Ando et al. | |
| 7,233,925 B1 | 6/2007 | Grandcolas et al. | |
| 7,240,327 B2 | 7/2007 | Singh et al. | |
| 8,301,618 B2 | 10/2012 | Allard | |
| 8,358,909 B2 | 1/2013 | Allard | |
| 8,805,817 B2 | 8/2014 | Allard | |
| 2002/0059637 A1 | 5/2002 | Rakib | |
| 2002/0095687 A1 | 7/2002 | Shintani | |
| 2002/0133827 A1 | 9/2002 | Newnam et al. | |
| 2003/0014496 A1* | 1/2003 | Spencer et al. | 709/217 |
| 2003/0028873 A1 | 2/2003 | Lemmons | |
| 2003/0034957 A1 | 2/2003 | Dubil | |
| 2003/0039465 A1 | 2/2003 | Bjorgan et al. | |
| 2003/0093790 A1 | 5/2003 | Logan et al. | |
| 2003/0097664 A1 | 5/2003 | Meyers | |
| 2003/0163832 A1 | 8/2003 | Tsuris | |
| 2003/0219234 A1 | 11/2003 | Burda | |
| 2004/0148292 A1 | 7/2004 | Clemens | |
| 2004/0187076 A1 | 9/2004 | Ki et al. | |
| 2005/0076393 A1 | 4/2005 | Sussman | |
| 2005/0097618 A1 | 5/2005 | Arling et al. | |
| 2005/0149987 A1 | 7/2005 | Boccon-Gibod | |
| 2005/0216563 A1 | 9/2005 | Stewart et al. | |
| 2005/0220439 A1 | 10/2005 | Carton et al. | |
| 2005/0232284 A1* | 10/2005 | Karaoguz et al. | 370/401 |
| 2005/0245272 A1 | 11/2005 | Spaur et al. | |
| 2006/0063518 A1 | 3/2006 | Paddon et al. | |
| 2006/0080710 A1 | 4/2006 | Carthern | |
| 2006/0136980 A1 | 6/2006 | Fulcher et al. | |
| 2006/0174277 A1 | 8/2006 | Sezan | |
| 2006/0259930 A1 | 11/2006 | Rothschild | |
| 2006/0265731 A1 | 11/2006 | Matsuda | |
| 2006/0271980 A1 | 11/2006 | Mankovitz | |
| 2007/0133938 A1 | 6/2007 | Park | |
| 2007/0156847 A1 | 7/2007 | Berkvens | |
| 2007/0282995 A1 | 12/2007 | Mizuno et al. | |
| 2007/0294337 A1* | 12/2007 | Gaos et al. | 709/203 |
| 2008/0127275 A1 | 5/2008 | Tang et al. | |
| 2008/0201748 A1* | 8/2008 | Hasek et al. | 725/98 |
| 2008/0208839 A1 | 8/2008 | Sheshagiri et al. | |
| 2008/0279453 A1 | 11/2008 | Candelore | |
| 2008/0305778 A1* | 12/2008 | Aaltonen et al. | 455/414.1 |
| 2008/0320546 A1 | 12/2008 | Moon et al. | |
| 2009/0158323 A1 | 6/2009 | Bober et al. | |
| 2009/0164904 A1 | 6/2009 | Horowitz et al. | |
| 2009/0214191 A1 | 8/2009 | Allard | |
| 2009/0216745 A1 | 8/2009 | Allard | |
| 2010/0235433 A1* | 9/2010 | Ansari et al. | 709/203 |
| 2012/0311641 A1 | 12/2012 | Allard | |

FOREIGN PATENT DOCUMENTS

| | | |
|---|---|---|
| JP | 2001211443 | 8/2001 |
| JP | 2002108870 | 4/2002 |
| JP | 2002118566 | 4/2002 |
| JP | 2002328831 | 11/2002 |
| JP | 2004005476 | 1/2004 |
| JP | 2004334372 | 11/2004 |
| JP | 2005027319 | 1/2005 |
| JP | 2006031428 | 2/2006 |
| JP | 2007086883 | 4/2007 |
| KR | 20040084395 | 10/2004 |
| KR | 100703567 | 3/2007 |
| TW | 200736953 | 10/2007 |
| TW | I394059 | 4/2013 |
| WO | WO-0147256 | 6/2001 |
| WO | WO-2004036913 | 4/2004 |
| WO | WO-2005099197 | 10/2005 |
| WO | WO-2007121117 | 10/2007 |

OTHER PUBLICATIONS

Tran, "Developing Device Independent Java Applications with JSR 188", W3C Workshop on Device Independent Authoring Techniques, Sun Microsystems, Inc., retrieved at <<http://www.w3.org/2002107/DIAT/posn/sun-jsr-188.html>>, pp. 1-2.

Brown, Barry et al., "The Television Will Be Revolutionized: Effects of PVRs and Filesharing on Television Watching", Retrieved from http://delivery.acm.org/10.1145/1130000/1124870/p663-brown.pdf?key1=1124870&key2=4845280711&coll=GUIDE&dl=GUIDE&CFID+10800895&CFTOKEN=61667937, Prceeding of the SIGCHI conference on Human Factors in computing systems, ACM 2006,(Apr. 22-27, 2006),pp. 663-666.

Phung, Dan et al., "Autonomic Control for Quality Collaborative Video Viewing", Retrieved from http://www.cs.columbia.edu/techreports/cucs-053-04.pdf, WOSS'2004, ACM, 2004,5 pages.

"PCT Search Report and Written Opinion", Application No. PCT/US2009/031841, (Sep. 7, 2009),11 pages.

"PCT Search Report and Written Opinion", Application No. PCT/US2009/031821, (Aug. 3, 2009),11 pages.

"Non-Final Office Action", U.S. Appl. No. 12/037,899, (Aug. 5, 2010),16 pages.

"Intrinsyc Supports TVcompass on Windows CE Development for WiFi Smart Remote Control", http://www.intrinsyc.com/company/news/pressreleases/2006/06_06_2006.asp.

"Harmony 880 Advanced Universal Remote (HD Ready)", http://www.ecost.com/detail.aspx?edp=3018056.

"Logitech Harmony Advanced Universal Remote Control 885", http://item.express.ebay.co.uk/Audio-TV-Electronics__Home-Audio-Hi-Fi Remote-Controls__Logitech-Harmony-Advanced-Universal-Remote-Control-885_W0QQitemZ9735155213QQihZ008QQptdnZRemoteQ20ControlsQQddnZAudioQ2cQ20TVQ20Q26Q20ElectronicsQQadnZHomeQ20AudioQ20Q26Q2.

"Automated Selection of the Active Device in Interactive Multi", http://www.cs.colorado.edu/~rhan/ActiveDevice.pdf.

"Final Office Action", U.S. Appl. No. 12/037,899, (Jan. 18, 2011),25 pages.

"Foreign Office Action", Chinese Application No. 200980106919.6, (May 3, 2012), 14 pages.

"Notice of Allowance", U.S. Appl. No. 12/037,899, (Jun. 12, 2012), 9 pages.

"Foreign Office Action", Chinese Application No. 200980106919.6, (Dec. 5, 2012), 8 pages.

"Decision on Reexamination", Chinese Application Number, (Apr. 25, 2013), 2 pages.

"Final Office Action", U.S. Appl. No. 13/586,276, (May 9, 2013),15 pages.

"Foreign Office Action", Japanese Application No. 2010-547667, (May 7, 2013), 7 pages.

"Non-Final Office Action", U.S. Appl. No. 12/037,899, (Apr. 28, 2011),29 pages.

"Non-Final Office Action", U.S. Appl. No. 12/037,907, (Jul. 28, 2011),16 pages.

"Extended European Search Report", European Patent Application No. 09715963.6, (Oct. 9, 2012), 9 pages.

"Foreign Office Action", Chinese Application No. 200980107020.6, (Aug. 2, 2012), 16 pages.

"Non-Final Office Action", U.S. Appl. No. 13/586,276, (Sep. 14, 2012), 12 pages.

"Notice of Allowance", U.S. Appl. No. 12/037,907, (Sep. 17, 2012), 9 pages.

Drucker, Steven M., et al., "SmartSkip: Consumer level browsing and skipping of digital video content", In Proceedings of CHI 2002, Available at <http://citeseerx.ist.psu.edu/viewdoc/download?doi=10.1.1.94.7249&rep=rep1&type=pdf>,(Apr. 2002), 8 pages.

"Advisory Action", U.S. Appl. No. 12/037,907, (Dec. 5, 2011), 3 pages.

"Final Office Action", U.S. Appl. No. 12/037,899, (Oct. 28, 2011), 33 pages.

"Final Office Action", U.S. Appl. No. 12/037,907, (Nov. 4, 2011), 18 pages.

"Foreign Office Action", Chinese Application No. 200980106919.6, (Sep. 26, 2011), 8 pages.

"Extended European Search Report", European Patent Application No. 09714317.6, (Aug. 2, 2013), 8 pages.

(56) References Cited

OTHER PUBLICATIONS

"Foreign Office Action", European Application No. 09715963.6, (Aug. 19, 2013), 5 Pages.

"Non-Final Office Action", U.S. Appl. No. 13/586,276, (Sep. 30, 2013),13 pages.

"Non-Final Office Action", U.S. Appl. No. 12/037,899, (Jan. 27, 2012),31 pages.

"Foreign Office Action", JP Application No. 2010-547667, Oct. 17, 2013, 4 Pages.

"Foreign Notice of Allowance", CN Application No. 200980106919.6, May 27, 2013, 4 pages.

"Foreign Notice of Allowance", CN Application No. 200980107020.3, Apr. 15, 2013, 6 pages.

"Foreign Notice of Allowance", RU Application No. 2010135578, Feb. 27, 2013, 18 pages.

"Foreign Notice of Allowance", TW Application No. 98102320, Jun. 27, 2014, 4 pages.

"Foreign Office Action", JP Application No. 2010-548760, Nov. 29, 2012, 5 pages.

"Foreign Office Action", TW Application No. 98102320, Feb. 18, 2014, 13 pages.

"Notice of Allowance", U.S. Appl. No. 13/586,276, Mar. 31, 2014, 9 pages.

"Foreign Office Action", KR Application No. 10-2010-7018439, Feb. 6, 2015, 19 pages.

"Foreign Notice of Allowance", JP Application No. 2010-548760, Sep. 20, 2013, 4 pages.

"Foreign Office Action", JP Application No. 2010-547667, Jan. 5, 2015, 8 pages.

"Foreign Office Action", TW Application No. 98102319, Jun. 12, 2015, 9 Pages.

\* cited by examiner

CONTENT MANAGEMENT THAT ADDRESSES LEVELS OF FUNCTIONALITY

BACKGROUND

Users typically possess many different types of devices where any of the devices can have different capabilities. With such a combination of different devices, content presentation in desired formats on the different devices has become problematic. Users are typically unable to receive content in formats that are easy to understand or read on the different device. Also, when content is received on the different devices, at least some of the devices having different capabilities, may be unable to present the content in a clear and conventional manner.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

In one example, a device may be bound to a network of devices where the devices in the network may have different levels of functionality. A level of functionality may be assigned to the device being bound to the network and content may be provided to the device based on the assigned level of functionality. For example, the data may be modified based on the level of functionality of the device and the modified data may be provided to the device. In addition, a menu may be provided indicating the devices in the network which may include the device being bound to the network.

In another example, content is sent to devices in a network based on the respective levels of functionality of the devices. The content may be modified for each of the devices in the network with different levels of functionalities such that the content may be provided at each of the devices in an appropriate fashion.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

Overview

Users have access to a wide range of clients which are capable of supporting a wide variety of functionality. For example, a coffee maker may support a single line of text output, a wireless phone may support internet browsing, a portable music player may support output of music and movies, a laptop computer may support "rich" input techniques such as a keyboard and mouse, and so on. However, content that may be accessible to these clients was typically targeted to a single collection of functionality which may not be universal across the clients. For example, a webpage may be accessible and viewed as intended by a laptop. On the other hand, when the same webpage is output by a wireless phone, interaction with the webpage may be hindered due to lack of optimization for a limited display area of the wireless phone. A variety of other examples are also contemplated.

Techniques are described to configure, communicate and/or manage output of content that addresses the functionality of the client that is to output the content. For example, devices may be divided up into a standard set of functional classes, e.g. advanced, minimum, basic, UI, one-way, two-way, and the like. The classes are created to create a uniform capability platform against which application developers can target application functionality. In addition, content may be configured into portions (e.g., atomic units) that address different functionality of the clients. Portions that correspond to functionality supported by the respective client class level may therefore be output by the respective clients. These portions may provide a variety of advantages.

For instance, a level of functionality may be assigned to a particular client. Portions of the content that correspond to the determined level may then be communicated to the client having the determined level, which will increase consumer satisfaction in their experience with the device as the functionality of the application designed will be more closely optimized for the device's capabilities. A variety of other instances are also contemplated, further discussion of which may be found in relation to the following figures.

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples. Systems described herein are provided as examples and not limitations. As those skilled in the art will appreciate, the present examples are suitable for application in a variety of different types of systems.

Exemplary Environment

Figure 1:
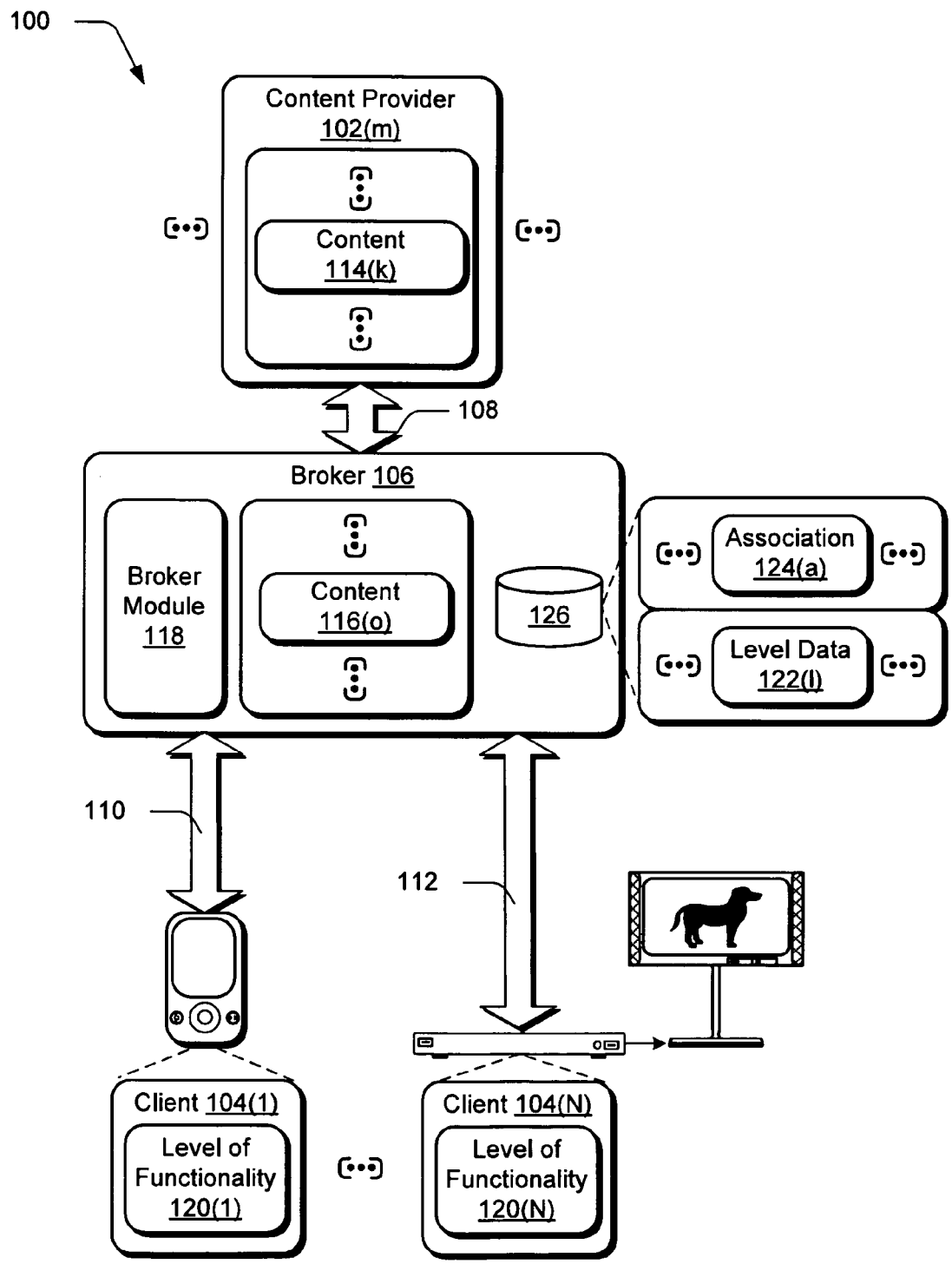
FIG. 1 is an illustration of an environment in an exemplary implementation that is operable to employ techniques to manage output of content that addresses the functionality of the client that is to output the content.

FIG. 1 is an illustration of an environment 100 in an exemplary implementation that is operable to employ techniques to manage output of content that address the functionality of the client that is to output the content. The illustrated environment 100 includes one or more content providers 102(*m*) (where "m" can be any integer from one to "M"), a plurality of clients 104(1)-104(N) and a broker 106 that are communicatively coupled, one to another, via network connections 108, 110, 112. In the following discussion, the content provider 102(m) and the broker 106 may be representative of one or more entities. Therefore reference may be made to a single entity (e.g., the content provider 102(m)) or multiple entities (e.g., the content providers 102(m), the plurality of content providers 102(m), and so on). Additionally, although a plurality of network connections 108, 110, 112 are shown separately, the network connections 108, 110, 112 may be representative of network connections achieved using a single network or multiple networks. For example, network connection 112 may be representative of a broadcast network with back channel communication, an Internet Protocol (IP) network, and so on.

The clients 104(1)-104(N) may be configured in a variety of ways. For example, the clients 104(1)-104(N) may be configured as a computer that is capable of communicating over the network connection 108, such as a desktop computer, a mobile station, an entertainment appliance, a set-top box communicatively coupled to a display device as illustrated, a wireless phone, and so forth. Thus, functionality of the clients 104(1)-104(N) may vary greatly, one from another, which is further detailed below.

The content provider 102(m) includes one or more items of content 114(k), where "k" can be any integer from 1 to "K". The content 114(k) may include a variety of data, such as television programming, video-on-demand (VOD) files, results of remote application processing, and so on. The content 114(k) is communicated over the network connection 108 to a broker 106.

Content 114(k) communicated via the network connection 108 is received by the broker 106, which is illustrated as content 116(o), where "o" can be any integer from one to "O". The broker 106 is also illustrated as including a broker module 118 that is representative of techniques to manage output of content 116(o) that addresses the functionality of the clients 104(1-104(N) that are to output the content 116(o). The broker module 118, for instance, may form the content 116(o) into portions, one or more of which address different functionality of the client 104(1)-104(N) types.

Client 104(1), for instance, which is illustrated as a portable music player may include functionality that is different than the functionality supported by client 104(N), which is illustrated as a set-top box. Thus, client 104(1) may have a "type" of functionality that is different than the "type" of functionality supported by client 104(N). For example, client 104(1), which may have significant functionality with relation to output of music, may be limited when addressing visual content (e.g., web content such as web pages) due to limited display area as opposed to client 104(N), which may have a significant amount of display area. Therefore, a level of functionality 120(1) of client 104(1) is less than a level of functionality 120(N) of client 104(N). The broker module 118, however, may form the content 116(o) to address the respective levels of functionality, further discussion of which may be found in relation to FIG. 2.

The broker module 118, for instance, may collect level data 122(1) from the clients 104(1)-104(N), e.g., through polling, periodic upload from the clients 104(1)-104(N), a one-time log on, and so on. For example, a user may interact with a user interface provided by the broker module 118 through a website that is output by the client 104(N). A unique identifier (e.g., a serial number) of client 104(1) may be entered via the user interface that identifies the client 104(1) and also associates the client 104(1) with a particular household that includes client 104(N), which may be identified through a single IP address or a range of IP addresses of the household. In another example, the household may be identified using authentication data that corresponds to a user, such as a user name and password that is used to authenticate the user (and consequently the clients 104(1)-104(N)) a single time to access one or more websites, an example of which is the WINDOWS LIVE authentication system and PASSPORT (WINDOWS, WINDOWS LIVE, and PASSPORT are trademarks of the Microsoft Corporation, Redmond, Wash.).

This information may then be stored as level data 122(1) (where "1" can be any integer from one to "L") and association 124(a) data (where "a" can be any integer from one to "A") in memory 126 or other computer-readable media of the broker 106. The level data 122(1) and the association 124(a) data may then be used by the broker module 118 to provide a variety of features.

Figure 2:
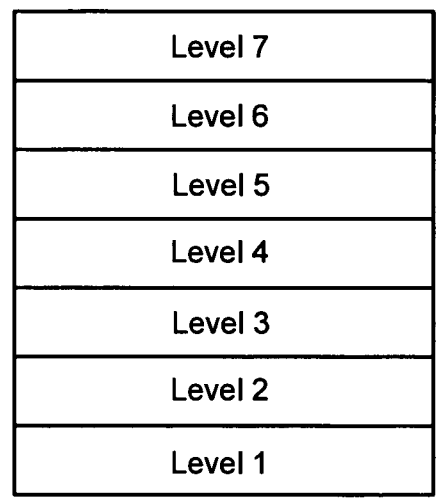
FIG. 2 illustrates an example of levels of functionalities of clients.

The broker module 118, for example, may form the content 116(o) into portions that are supported by different functionalities, such as output (e.g., text vs. HTML, sound, and so on), input (e.g., whether an input device is available), screen size, and so on, further discussion of which may be found in relation to FIG. 2. The portions may then be provided to the respective clients 104(1)-104(N) based on the respective level of functionality 120(1)-120(N). In an implementation, subsequent provision of the content is performed without communication through the broker 106, e.g., the content provider 102(m) may configure the content 114(k) into portions, each of which are delivered to the clients 104(1)-104(N). Distribution of the content 116(o) to the client 104(1)-104(N) may be accommodated in a number of ways, including cable, radio frequency (RF), microwave, digital subscriber line (DSL), satellite, via Internet Protocol (IP) connection, and so on.

Generally, any of the functions described herein can be implemented using software, firmware, hardware (e.g., fixed-logic circuitry), manual processing, or a combination of these implementations. The terms "module", "functionality", "engine" and "logic" as used herein generally represent software, firmware, hardware, or a combination thereof. In the case of a software implementation, for instance, the module, functionality, or logic represents program code that performs specified tasks when executed on a processor (e.g., CPU or CPUs). The program code can be stored in one or more computer-readable memory devices, such as the memory 126. The features of the techniques described herein are platform-independent, meaning that the techniques may be implemented on a variety of commercial computing platforms having a variety of processors.

As previously described in relation to FIG. 1, a network of clients (e.g., clients 104(1)-104(N)) may include different numbers and/or types of devices and/or software. The clients may include wireless or wired clients and/or clients of differing functionalities or capabilities as previously described. The level of functionality of a client corresponds to the functionality of the client. A client with a low level of functionality may have fewer capabilities than a client with a high level of functionality with respect to different types of functionality. For example, a client with a low level of display functionality (e.g., client 104(1) configured as a portable music player) may be capable of displaying certain amounts of text in certain formats while the same client may be incapable of certain more complex features such as, for example, presenting graphical images, presenting video in different formats, or presenting certain web page formats. Conversely, a client with a high level of display functionality (e.g., client 104(N) configured as a set-top box) may have additional capabilities. Such a client may be capable of presenting additional types of data or may be capable of presenting data in more complex formats or under more diverse conditions.

There may also be different numbers of levels of functionality for different clients. In a network of clients in which multiple clients may be in communication with at least one other client, the clients in the network may have a different level of functionality from the other clients, e.g., client 104(1) vs. client 104(N). Thus, certain clients in the network of clients may have different levels of functionality while still other clients may have the same or close to the same levels of functionality.

FIG. 2 illustrates an example of levels of functionalities of clients. FIG. 2 illustrates an example of seven levels of functionality, however, there may be any number of levels of functionality. For example, there may be two, three, four, five, six, eight, nine, ten, or more than ten levels of functionality. In the example of FIG. 2, a level 1 functionality may be a relatively "low" level of functionality when compared to the other levels, such that clients with a level 1 functionality may have capabilities of presenting text in a single direction, but not more. For example, a level 1 functionality client (e.g., a coffee maker) may present text to a user but may lack certain capabilities such as permitting a user to input text or capabilities of presenting graphical images to a user.

As also illustrated in the example of FIG. 2, a client may have "level 2" functionality. In this example, a level 2 functionality may correspond to a client that is capable of presenting the data that is presented by a level 1 functionality client and is also capable of presenting color data and icons, e.g., a "smart" thermometer showing color icons of upcoming weather. In this case, a level 2 functionality client (like a level 1 functionality client) is not capable of receiving input from a user, i.e., a level 2 functionality client in this example is a one-way client.

Also, a level 3 functionality client may be present that, in this example, is capable of presenting data that a level 2 functionality client is capable of presenting. In addition, a level 3 functionality client may also be capable of receiving input from a user. In other words, a level 3 functionality client in this example may be a two-way client. In this case, a user may receive content such as text or icons and may further input a selection or other form of input to the system via the level 3 client. In one example, user input may include clicking or selecting menu items, managing subscription lists or adding/removing data locally.

A level 4 functionality client may have the capabilities of a level 3 functionality client in addition to other capabilities. As one example, a level 4 functionality client may also have the capability of QVGA compositing for rendering, for example, gadgets. Level 5 functionality clients may further include text input such that rendered gadgets may receive user input, including text input. A level 6 functionality client may add further features or capabilities such as, for example, a client application model such as client application switching dedicated databound applications (e.g., smartplow, IM, and so on). Also, a level 7 functionality client in this example may include additional capabilities or full capabilities as in, for example, VGA or browser capabilities. These seven levels allow for applications to be created and targeted to various consumer electronic devices to take advantage of their capabilities, ensuring a positive consumer experience. Minor variations in device capabilities (e.g., clients 104(1)-104(N)) are ignored allowing an application provider to write an application once to address a level of devices broadly. In some embodiments, a device may have capabilities that place it in a level where some of those capabilities are not used, because it lacks a core capability. For example, a device (e.g., client 104(N)) may have the ability to render gadgets but lack 2-way functionality. Given that, the device will still be classified as a level 2 device as described above. This means that an application with gadgets may not be transmitted to the device even though it could render the application. However, in this embodiment, the hierarchy of capabilities is enforced to ensure a base level consumer experience, further discussion of which may be found in relation to the following figure.

FIG. 2 is merely one example of a division of client levels of functionality, a variety of other divisions are also contemplated. For example, three levels of functionality may be used, e.g., low functionality, medium functionality, high functionality, in which each higher level may include additional capabilities or functionality that lower level clients may lack and in which capabilities may be assigned to different levels as needed or desired.

In an implementation, the levels of FIG. 2 are maintained within a hierarchy such that each successive level in the hierarchy supports the functionality "below" as well as support for an additional item of functionality. For example, a level three client may support the additional item of receiving an input as well as the display functionality of levels two and one. A variety of other examples are also contemplated.

Figure 3:
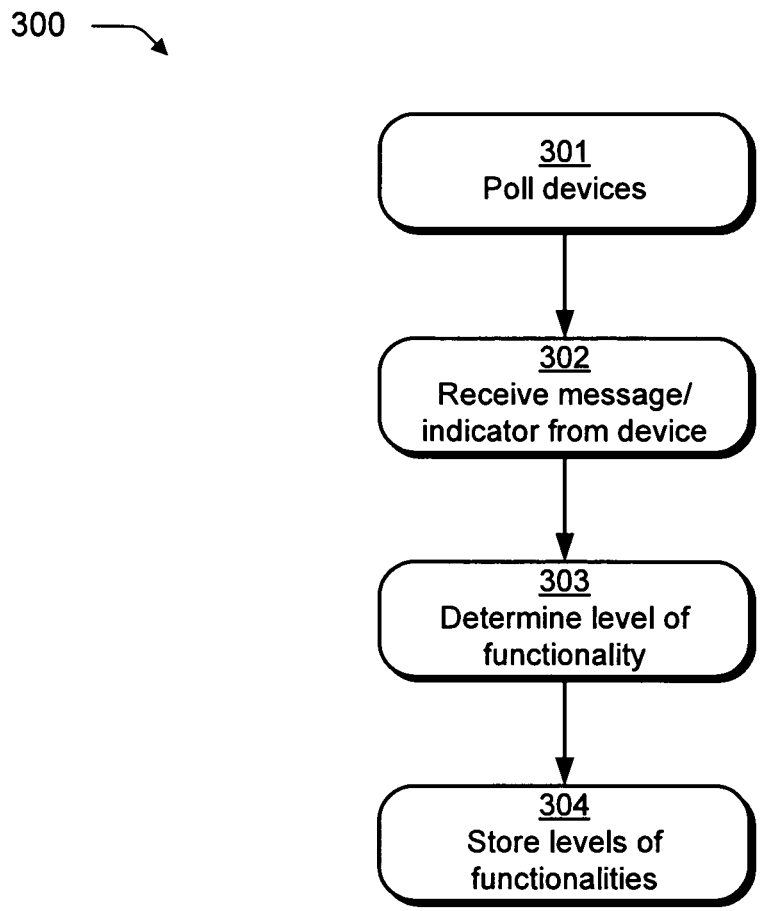
FIG. 3 is a flowchart illustrating one example of management of clients in a network according to level of functionality of the clients.

FIG. 3 is a flowchart illustrating one example 300 of management of clients in a network according to level of functionality of the clients. In this example, different clients in a network are assigned different levels of functionality as previously described in relation to FIGS. 1 and 2. As previously described, for instance, clients 104(1)-104(N) may be configured to have different functionality and be assigned to a level of functionality that most closely corresponds to the functionality available from the respective client. Content 116(o), for instance, may further be presented on each of the different clients (e.g., clients 104(1)-104(N)) in the network even though the level of functionality of the different clients may not be the same.

For a network of clients, the level of functionality for each of the clients may be determined. The level of functionality for each client may be determined in a number of ways. As illustrated in the example of FIG. 3, clients in the network may be polled (block 301). In this example, a client such as a broker (e.g., broker 106) may poll each client (e.g., clients 104(1)-104(N)) in a network to identify the corresponding levels of functionality of the client. Responsive to a polling signal or message, one or more of the clients (e.g., clients 104(1)-104(N)) in the network may return a message or indicator to the broker (block 302), e.g., broker 106. Based on the message or indicator received from the respective clients (e.g., clients 104(1)-104(N)), the broker may determine a level of functionality of the corresponding device (block 303). The levels of functionalities thus determined may be stored (block 304).

The functionality of the device may be upgraded independently of the knowledge of the service, e.g., broker 106. Accordingly, in one embodiment, a device (e.g., client 104(1)) is polled periodically to verify whether it should be classified into a different level. For example, a device may be field upgradable through reflashing its memory to obtain new capabilities, addition of a peripheral device, upgrade in network capabilities, and so on. The broker 106 may poll the clients 104(1)-104(N) periodically or, in an alternate embodiment, the clients 104(1)-104(N) would notify the broker 106 upon receiving its updates that its level has changed.

The broker 106 may also determine the level of functionality of the clients 104(1)-104(N) by running tests on the clients 104(1)-104(N). A client 104(N) that is two-way capable, for instance, may be connected to a network and the broker 106 (e.g., through execution of the broker module 118) may perform basic tests on the client 104(N) to classify it properly, e.g., to a level that most closely corresponds to the functionality available via the client 104(N).

Clients that are not network enabled may also be classified, such as by a user of the client independently by accessing the broker 106 and entering the client information, through execution of one or more modules locally on the client via a computer-readable medium, and so on. The broker 106 in one embodiment has a database of client types and may match the registration information to entries in the database and then assign a level to the clients 104(1)-104(N). If the clients 104(1)-104(N) are not in the database, the broker 106 may provide a questionnaire to the user to allow the user to define the capabilities of the clients 104(1)-104(N). Using that information, the broker 106 may assign the clients 104(1)-104(N) to the closest (i.e., "nearest") level of functionality that corresponds to the client. A variety of other examples are also contemplated.

Figure 4:
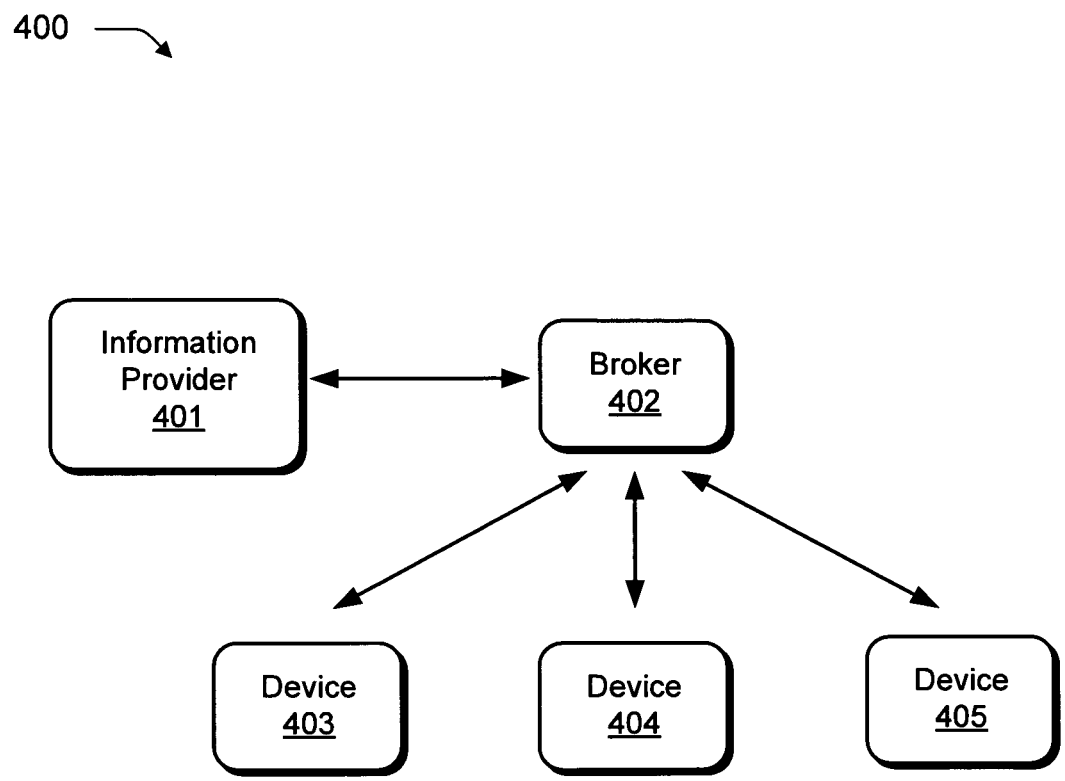
FIG. 4 illustrates an example of a system for providing content in a network.

FIG. 4 illustrates an example of a system 400 for providing content in a network. In this example, the system includes at least one information provider 401, a broker 402 and a number of devices (e.g., device 403, device 404, device 405) in a network. The broker 402 and the devices 403, 404, 405 may or may not correspond to the broker 106 and clients 104(1)-104(N) of FIG. 1, respectively.

The information provider 401 may provide a variety of types or forms of content to the broker 402 and may also include a variety of sources of information or content. Non-limiting examples of information providers 401 include news sources, stock ticker data sources, web sites, and so on. The broker 402 may receive the information or content from the information provider 401 and may further process or store the data for transmission to one or more of the devices (e.g., 403, 404 and/or 405) in the network.

For example, the broker 402 may poll the devices (403, 404, 405) to determine a level of functionality for each of the devices (FIG. 3, block 301). The devices (403, 404, 405) may return a message or indicator to the broker 402 indicating a level of functionality for the devices (FIG. 3, block 302). The broker 402 receives each of the messages/indicators from the devices in the network (403, 404, 405) and, based on the corresponding messages/indicators, the broker 402 may determine a level of functionality for each of the devices (FIG. 3, block 303).

One or more of the devices 403-405 in the network may have a different level of functionality from one or more other devices 403-405 in the network. Conversely, one or more of the devices 403-405 in the network may have the same or similar level of functionality as one or more other devices 403-405 in the network. In addition, the broker 402 may have a computer-readable medium (e.g., memory or storage device) for storing the levels of functionalities for each of the devices (FIG. 3, block 304). In this case, content received from the information provider 401 may be modified based on a corresponding level of functionality of a device in the network and the modified content may be sent from the broker 402 to the corresponding device. Alternatively or additionally, the content may be sent to a device in the network from the information provider 401.

Figure 5:
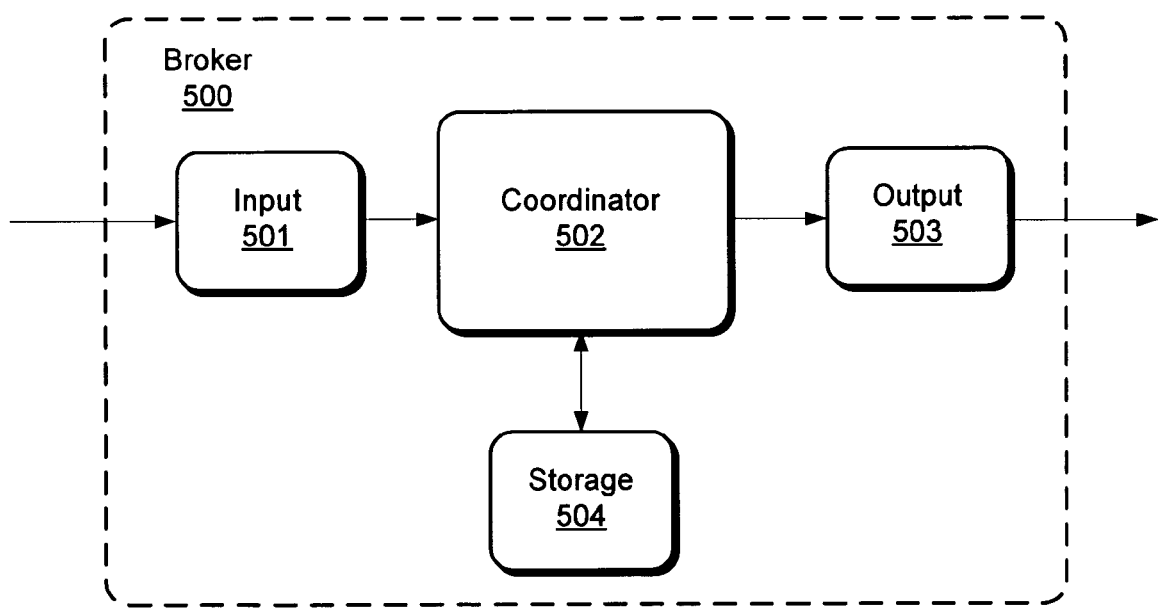
FIG. 5 illustrates an example of a broker.

FIG. 5 illustrates an example of a broker, which may or may not correspond to the broker 106 of FIG. 1 and/or the broker 402 of FIG. 4. FIG. 5 is merely one example for illustration purposes as a variety of different components may be arranged or combined in different configurations, additional components may also be present and some components may be omitted.

In the example illustrated in FIG. 5, the broker 500 includes an input 501. The input 501 may receive a message or indicator from a remote device or remote data source. For example, a data source may transmit a data stream (illustrated as an arrow) of content to the broker 500 via the input 501. The broker 500 receives the content from the data source in this example and may further process the content based on a level of functionality of a device. For example, the broker 500 may further include a storage 504 (e.g., implemented via memory or other computer-readable medium) that may contain data pertaining to levels of functionality of devices.

A device with a particular level of functionality may also request content from the broker 500. The content may be processed in a coordinator 502 of the broker 500 based on the level of functionality of the device requesting the content. If the device has a low corresponding level of functionality, the coordinator 502 may modify the content to include a particular amount of data or to include the content in a particular format corresponding to the level of functionality of the device. The modified content may be output via output 503 to the device requesting the content. Hence, in this example, the modified content may be provided at the device to a user in a format and/or in a configuration appropriate for the device based on the level of functionality of the device.

A device may further be added to a pre-existing network such that the new device joins or binds to the network. When the new device is joined to the network, the new device may be listed on a menu to a user to indicate the inclusion of the new device in the network.

Figure 6:
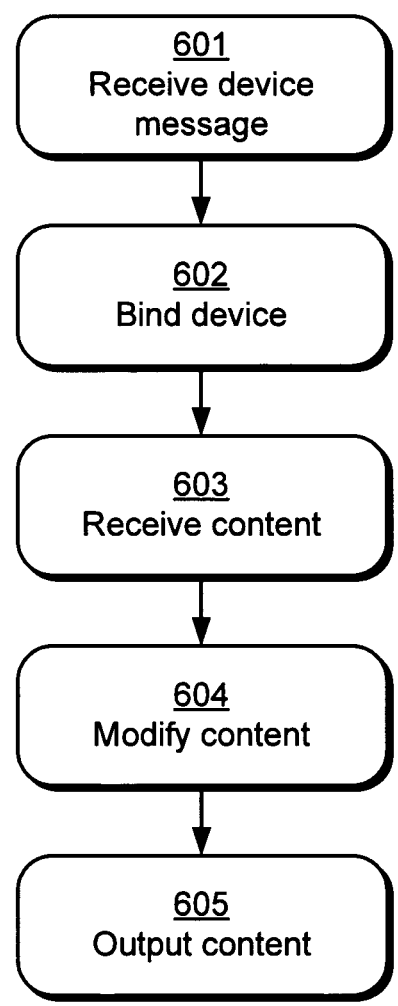
FIG. 6 is a flowchart illustrating one example of adding or binding a client to a network.

FIG. 6 is a flowchart 600 illustrating one example. In this example, a new device (e.g., client 104(1)) is added to a network or is bound to a network through a binding action in which the new device (e.g., client 104(1)) sends a message that is received by a binding mechanism or system, such as a broker (block 601), e.g., broker 106.

The message may include, for example, a signal indicating that a new device is to be added to the network. In addition, the message may include further instructions on the form and/or type of content desired on the new device (e.g., client 104(1)). Also, the message may include a corresponding level of functionality of the new device (e.g., client 104(1)). The broker (e.g., broker 106) may further send a message to the new device (e.g., client 104(1)) which may include, for example, an address or identifier of the new device (e.g., client 104(1)) for identifying the new device as a new device in the network. Thus, the broker (e.g., broker 106) may bind the device to the network (block 602).

As the example of FIG. 6 illustrates, the new device (e.g., client 104(1)) may be associated with a level of functionality as discussed in relation to FIG. 2. The level of functionality may describe the capabilities of the new device and/or the type, amount, and/or form of content for the new device (e.g., client 104(1)). The broker (e.g., broker 106) may receive content (e.g., content 116(o)) from a data source (block 603) and may further send the content to any device in the network, e.g., clients 104(1)-104(N).

Also, the broker may modify the content (block 604) based on any number of factors. For example, the broker (e.g., broker 106) may modify the content 116(o) based on a level of functionality of the device that is to receive the content 116(o). In this example, the broker 106 outputs the content 116(o) (block 605) to the new device (e.g., client 104(1)), which may receive content for presentation to a user from the broker 106. Alternatively or additionally, the content 116(o) may be received at the new device (e.g., client 104(1)) directly or indirectly from the data source, e.g., content provider 102(m).

The content 116(o) received and/or presented at the new device (e.g., client 104(1)) may further be modified or formatted to correspond to the level of functionality of the new device in the network (block 604). For example, if the new device has a low level of functionality (e.g., limited display capabilities), the content 116(*o*) may be modified (block 604) such that the data may be presented at the new device (e.g., client 104(1)) in a desired format or containing desired information. Conversely, if the new device (e.g., as described in relation to client 104(N)) has a high level of functionality, the content 116(*o*) may be presented in more complex formats or additional data may be included in the content to be presented at the new device.

Thus, in one example, the broker (e.g., broker 402) may receive content from a data source (e.g., information provider 401) and may further send the content to a device (e.g., devices 403-405) in a network based on the level of functionality of the device. Devices (e.g., devices 403-405) in the network may have differing levels of functionality, one from another. Alternatively, devices (e.g., devices 403-405) in the network may have the same or similar levels of functionality, one to another.

If different devices (e.g., devices 403-405) in the network have different levels of functionality, the content from the information provider 401 may be sent to the different devices (e.g., devices 403-405) such that the content may be presented or displayed at the devices (e.g., devices 403-405) in accordance with the respective levels of functionality of the devices (e.g., devices 403-405). Thus, the content may be formatted in different ways based on the different levels of functionalities of the devices (e.g., devices 403-405). As one example, a device with a high level of functionality may receive and present data in a more complex format than a device with a low level of functionality.

The content 116(*o*) may be modified in any number of ways such that the modified data is in accordance with the level of functionality of the devices (e.g., clients 104(1)-104(N)). In addition, the content may be modified in different ways for different devices, for example, when the different devices have different levels of functionality. In one example, the broker (e.g., broker 106) may receive the content 116(*o*) from a data source (e.g., content provider 102(*m*)), may further modify the data based on a level of functionality of a receiving device (e.g., client 104(1)), and may further send the modified data to the receiving device for presentation at the receiving device. In another example, the data source (e.g., content provider 102(*m*)), may modify the content 116(*o*) based on a level of functionality of a receiving device and may transmit the content 116(*o*) with corresponding levels of functionality. Alternatively or additionally, the data source (e.g., content provider 102(*m*)) may modify the content 116(*o*) as described and may send the data to a broker 106 which may transmit the data to the clients 104(1)-104(N) with a corresponding level of functionality. As another example, the clients 104(1)-104(N) may modify the content 116(*o*) that is received either from a data source (e.g., content provider 102(*m*)) or from a broker (e.g., broker 106), and may present the modified data to a user. The device in this example may modify the content based on its own level of functionality.

In another example, the amount of data presented at a device may be determined by a level of functionality of the device. For example, the broker 106 or the content provider 102(*m*) may determine a level of functionality of the client 104(1) by receiving an indicator of the level of functionality from the client 104(1). Alternatively, the broker 106 or the content provider 102(*m*) may poll the clients 104(1)-104(N) to determine corresponding levels of functionality for each of the clients 104(1)-104(N) and may modify the content 116(*o*) to be sent to a particular one of the clients 104(1)-104(N) in the network based on the corresponding determined level of functionality for that client.

In this example, the broker 106 may determine an amount of content 116(*o*) to be transmitted to the client 104(1) based on the indicated level of functionality of the client 104(1). For example, if the level of functionality of the client 104(1) is low, the broker 106 may modify the content 116(*o*) such that a lesser amount of content 116(*o*) may be sent to the client 104(1). In this example, the broker 106 may determine a portion of the content 116(*o*) to be sent to the client 104(1) and another portion of the content 116(*o*) to be withheld from the client 104(1). The portion of the content 116(*o*) identified as content to be sent to the client 104(1) is sent to the client 104(1) in this example while the other portion of the content 116(*o*) determined to be withheld from the client 104(1) is not sent. Hence, the client 104(1) receives content that is appropriate for the level of functionality of the client 104(1). Also in this example, the client 104(1) may present or display the content 116(*o*) to a user in a format commensurate with the level of functionality of the client 104(10.

Also, a data source may provide content with an indicator for indicating a manner of presenting the content on a client. In this example, the data source (e.g., information provider 401) may transmit content to a broker 402 or may transmit the content to one or more devices 403-405 for presentation to a user. The information provider 401 may further provide a corresponding indicator that indicates a level of functionality for a device (e.g., one or more of devices 403-405) to present the content to the user. In an implementation, the content and the indicator may be sent to the broker 402 which may modify the content based on the indicator. Alternatively or additionally, the devices 403-405 may send an indicator to the broker 402 indicating a level of functionality of the device. Based on the indicator, the broker 402 may modify the content and send the modified content to the device for presentation to a user.

In one example, the broker 402 may compare the indicator from a device 403 with the indicator from the information provider 401. If a match is detected, the broker 402 may send the content to the device 403 without modifying the content. If the indicator from the device 403 indicates that the level of functionality of the device 403 is lower than the level of functionality of the current state of the content from the information provider 401, the broker 402 may modify the content to correspond to the level of functionality of the device 403. Alternatively, the broker 402 may send the content to the device 403 with parameters for modification (e.g., for presentation) of the content at the device 403 based on the level of functionality of the device 403. In this way, content that otherwise would not be suitable for output by the device may be modified by the device for output.

A variety of different modifications to the content as described above may be made. For example, the amount of data may be modified by selection of portions of data to be sent or presented. Also, the formatting of the data may be modified. In this example, content may be modified such that the formatting of the content corresponds to a level of functionality of a device. Hence, the content may be presented at a device in a format that is appropriate for the device to enhance a user experience.

Figure 7:
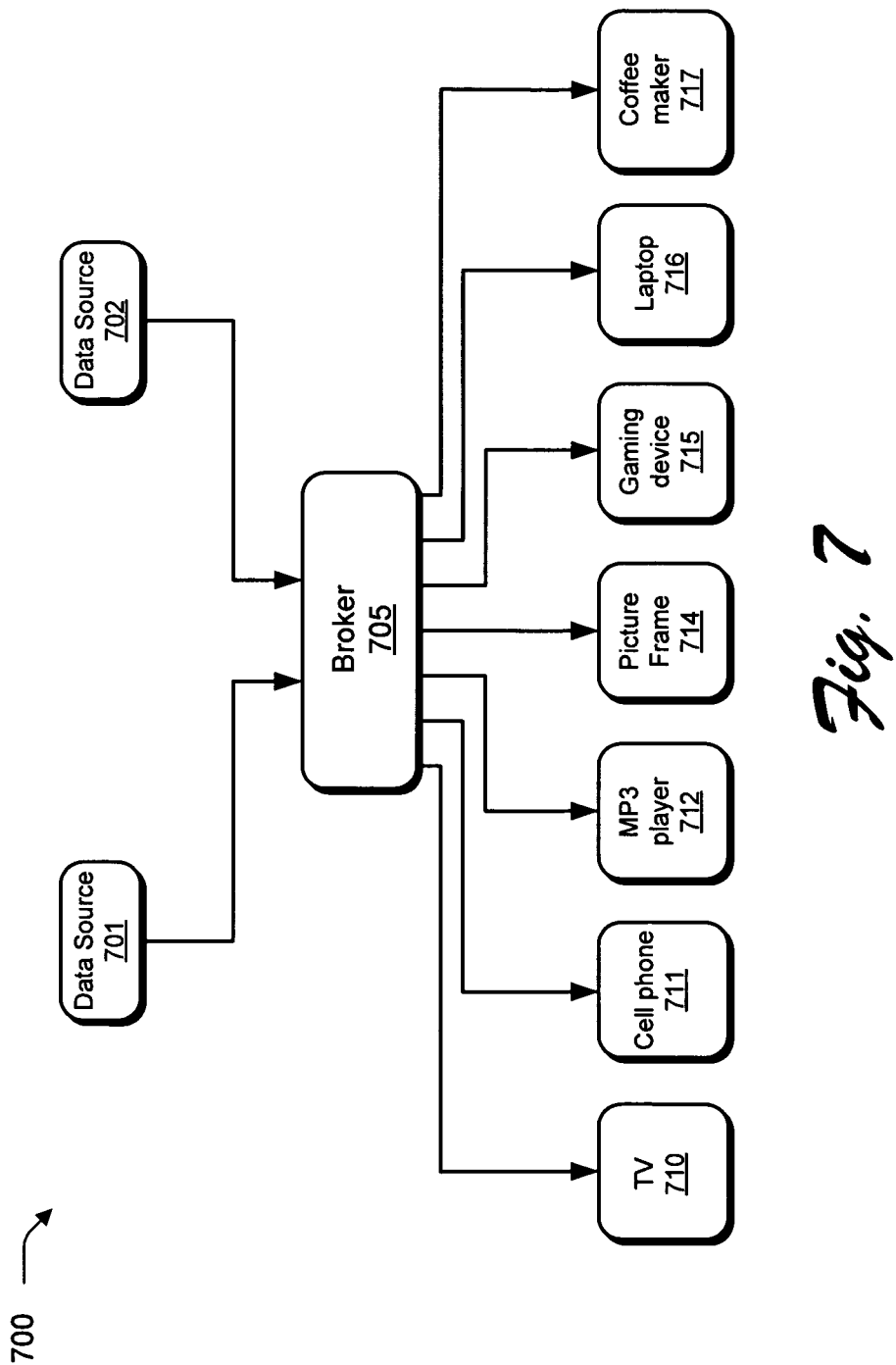
FIG. 7 illustrates an example of a network including different clients with different levels of functionalities.

FIG. 7 illustrates an example 700 of a network including different devices. In the illustrated example 700, the network may include any type of devices of differing levels of functionality. Data sources may provide content to the devices. In this example, two data sources (701, 702) are illustrated, however, one or more numbers or types of data sources may provide content. Also, the data sources (701, 702) provide content to a broker 705 which provides the data to one or more of the devices. In this example, the broker 705 provides the content to the devices based on levels of functionality of the different devices.

In this example, the devices in the network 701 include a television 710, a cell phone 711, an MP3 player 712, an electronic picture frame 704, a gaming device 705, a laptop computer 716 and a coffee maker 717. One or more of the devices in this example may have a different level of functionality from one or more other devices in the network. For example, the coffee maker 717 may have a different level of functionality than the TV 710. In one example, the coffee maker may include a display for presenting text data to a user. Such text data may include, for example, stock quote information on a stock ticker.

However, the coffee maker 717 may have a lower level of functionality as compared to the TV 710. For example, the TV 710 may be capable of displaying color graphics or icons while the coffee maker 717 may lack this functionality. Likewise, the electronic picture frame 714 may also be capable of displaying color graphics or icons. Hence, the TV 710 and the electronic picture frame 714 may have a higher level of functionality compared to the coffee maker 717.

In addition, a cell phone 711 may be capable of performing additional functions. The cell phone 711 may be capable of, for example, receiving user input and may be capable of maintaining a two-way communication between the user of the cell phone 711 and the broker 705 or a data source (701, 702). Thus, in this case, the cell phone 711 may have a higher level of functionality compared to the coffee maker 717, the TV 710 and the electronic picture frame 714. Likewise, the network may include an MP3 player 712 that includes a display. The MP3 player 712 may provide additional functionality such as, for example, enabling text input. Hence, the MP3 player 712 may have a higher level of functionally compared to, for example, the coffee maker 717. A gaming device 715 and/or a laptop computer 716 may also be included in the network. Each of these devices may have a different level of functionality compared to other devices in the network. For example, the laptop computer 716 may include a device application model and/or browser functionality.

Hence, in this example, the different devices may be associated with different levels of functionality. If there are, for example, seven levels of functionality as illustrated in the example of FIG. 2, the broker 705 may send appropriate content to the devices based on the respective levels of functionality of the devices. In one example, each of the devices (TV 710, cell phone 711, music player 712, picture frame 714, gaming device 715, laptop 716, and coffee maker 717) registers with the broker 705 by sending a message, signal or beacon to the broker 705. Also, the devices may request certain information or data from the broker 705 or data sources (701, 702). In one example, a computing device may also be used to provide a menu of devices participating in the network and/or the desired information for each of the devices. The computing device may receive the device information from the broker 705 and display the information to a user.

Data may be received at the broker 705 from one or more of the data sources (701, 702). The data may further be provided by the broker 705 to the devices based on registration of the devices in the network and level of functionality of the devices. In one example, stock information is received from data source 701 at the broker 705. The coffee maker 717 is registered in the network as a level 1 device (i.e., low level of functionality in this example) that is just capable of presenting text data. Hence, a user may check stock quotes while using the coffee maker 717 but may not perform more complex functions on the coffee maker 717 with respect to the stock quotes. The broker 705 sends level 1 functionality stock quote data to be displayed in a ticker on the coffee maker 717. In addition, another device with a higher level of functionality may also be registered in the network as receiving stock quote information.

For example, the laptop 716 may have a high level of functionality (e.g., level 7 in this example) and may also request stock quote information. Because the laptop 716 in this example has a high level of functionality, the stock quote information may be presented on the laptop (from the broker 705) with additional features as compared to the display of stock quote information on the coffee maker 717. The stock quote information, for instance, may be presented in color, with a number of graphical elements or icons, and/or in a browser. Also, users may be able to input commands or data into the laptop 716 with respect to the stock quotes (e.g., users may place a stock trade or check additional information on the companies associated with the stock tickers). Hence, in this example, different devices in the network with different levels of functionalities may receive data based on the level of functionality. Devices with higher levels of functionality may receive a larger amount of data or more complex formatted data as compared to devices with lower levels of functionality, for example.

It is understood that aspects of the present description can take many forms and embodiments. The embodiments shown herein are intended to illustrate rather than to limit the description, it being appreciated that variations may be made without departing from the spirit of the scope of the invention. Although illustrative embodiments have been shown and described, a wide range of modification, change and substitution is intended in the foregoing disclosure and in some instances some features may be employed without a corresponding use of the other features. Accordingly, it is appropriate that the appended claims be construed broadly and in a manner consistent with the scope of the description.

What is claimed is:

1. A method comprising:
   receiving an input that identifies a client device and a level of functionality of the client device, the level of functionality comprising an indication of a corresponding level describing capabilities of the client device with respect to different types of functionality;
   forming a communication, to be communicated over a network, which indicates an association of the client device to a particular household and the level of functionality of the client device; and
   communicating the communication for receipt by a broker device, the communication enabling the broker device to store the association of the client device to the particular household and the level of functionality of the client device, and to modify content from an information provider, the content having multiple portions that address different client functionality and enable the broker device to modify the content by:
   selecting one or more of the multiple portions for communication to the client device, the one or more of the multiple portions that are selected corresponding to the level of functionality of the client device such that a larger number of the multiple portions are selected for higher levels of client functionality than for lower levels of client functionality, at least some portions of the larger number being directed to client functionality of the higher levels that is not enabled at the lower levels of client functionality; and configuring the content to include the one or more selected portions for communication to the client device.

2. A method as described in claim 1, wherein the input is received via a user interface that is output by another client device that performs the receiving and the forming.

3. A method as described in claim 1, wherein the particular household is identified through use of one or more Internet Protocol (IP) addresses.

4. A method as described in claim 1, wherein the input is received in response to a poll sent by a client device that performs the receiving and the forming.

5. A method as described in claim 1, wherein the communication further includes authentication data that corresponds to a user.

6. A method as described in claim 5, wherein:
the authentication data is configured for processing by an authentication service; and
authentication of the authentication data by the authentication service permits access to a plurality of websites without resubmitting the authentication data.

7. A method as described in claim 1, wherein:
the particular household is associated with a plurality of said client devices; and
at least one said client device has a level of functionality that is different than a level of functionality of another said client device.

8. A method as described in claim 1, further comprising obtaining the content by the client device, wherein the content corresponds to the level of functionality indicated in the communication for the client device.

9. A method as described in claim 8, wherein the obtaining is performed without delivery of the content through a device that performs the receiving and the forming.

10. A method as described in claim 8, wherein the one or more portions of the content that are selected do not include at least one portion that is not supported by the functionality of the client device.

11. A method as described in claim 1, wherein the level of functionality is included within a hierarchy having a plurality of said levels.

12. A method as described in claim 11, wherein the hierarchy is arranged such that each said successive level supports the functionality of a previous said level and at least one item of functionality that is not supported by the previous said level.

13. A method as described in claim 11, wherein at least one said level corresponds to absence of an input device and another said level corresponds to inclusion of an input device.

14. A method as described in claim 1, wherein the communication is formed for communication over the network configured as an Internet.

15. A method comprising: polling, by a broker device, one or more client devices to determine a level of functionality supported by the one or more client devices; receiving, at the broker device, messages from the one or more client devices responsive to the polling; determining, by the broker device, the level of functionality supported by the one or more client devices from the messages, the level of functionality corresponding to capabilities of the client devices with respect to different types of functionality such that higher levels of client functionality are determined for the one or more client devices that support both lower levels of client functionality and additional types of functionality associated with the higher levels, the determining including the broker determining that a client device, that supports each of the different types of functionality associated with a lower level of client functionality and some of the additional types of functionality but not each of the additional types of functionality associated with a higher level, supports the lower level of client functionality; storing, by the broker device, the level of functionality supported by the one or more client devices; and forming, by the broker device, a communication including content and parameters that enable modification of the content by the one or more client devices to the level of functionality supported by the one or more client devices.

16. A method as described in claim 15, wherein:
the level of functionality is included within a hierarchy having a plurality of said levels; and
the hierarchy is arranged such that each successive said level supports the functionality of a previous said level and at least one item of functionality that is not supported by the previous said level.

17. A method as described in claim 15, wherein:
the content is formed into a plurality of portions, with each said portion corresponding to one or more different functionalities; and
the parameters indicate which said portions correspond to which said functionalities.

18. A system comprising: one or more processors; and one or more computer-readable memories comprising instructions that are executable by the one or more processors to perform operations comprising: polling, by a broker device, a client for an identifier of the client; receiving, at the broker device, the identifier of the client responsive to the polling; associating, by the broker device, the identifier of the client to a particular household having a plurality of other identifiers of a plurality of other clients and store the association to the particular household, each said client also being associated with an indication that is stored of a corresponding level of a hierarchy arranged such that each said level is successively ordered, one after another, to: support functionality of a previous said level; and include functionality that is not supported by the previous said level; and forming, by the broker device, content for delivery to a plurality of said clients to be output by the plurality of said clients, the content having multiple portions that address different client functionality, the forming involving making level-based modifications to the content that include selecting one or more of the portions of the content for each of the plurality of said clients that are commensurate with its level of the hierarchy, the portions selected to configure the content for higher levels of the hierarchy including at least one portion that is withheld from the content configured in accordance with a lower level of the hierarchy, the at least one portion addressing the client functionality of the higher levels of the hierarchy that is not enabled at the lower level of the hierarchy.

19. A system as described in claim 18, wherein each said portion has a corresponding said level of the hierarchy.

20. A system as described in claim 18, wherein the functionality is based at least in part on hardware resources.

* * * * *